R. McKENNA.

Cotton-Gins.

No. 5,663. Reissued Nov. 18, 1873.

WITNESSES.
P. C. Dieterich
J. B. Baker

INVENTOR.
Robert McKenna per T. H. Alexander Jr.
ATTORNEYS.

A.M. PHOTO-LITHOGRAPHIC Co. N.Y. (OSBORNE'S PROCESS)

UNITED STATES PATENT OFFICE.

ROBERT McKENNA, OF WHITE'S STATION, TENNESSEE.

IMPROVEMENT IN COTTON-GINS.

Specification forming part of Letters Patent No. 108,500, dated October 18, 1870; reissue No. 5,148, dated November 19, 1872; reissue No. 5,663, dated November 18, 1873; application filed November 10, 1873.

*To all whom it may concern:*

Be it known that I, ROBERT McKENNA, of White's Station, in the county of Shelby and State of Tennessee, have invented certain new and useful Improvements in Cotton-Gins; and I do hereby declare that the following is a full, clear, and exact description thereof, reference being had to the accompanying drawing, and to the letters of reference marked thereon.

The nature of my invention consists in the employment of a roller or shaft, located horizontally and longitudinally in the roll-box, and provided with a series of flanged disks throughout its length, at equal distance from each other, which distance corresponds with the spaces between the saws on the saw-cylinder.

In order to enable others skilled in the art to which my invention appertains to make and use the same, I will now proceed to describe its construction and operation, referring to the annexed drawing, which forms a part of this specification, and in which—

Figure 2:
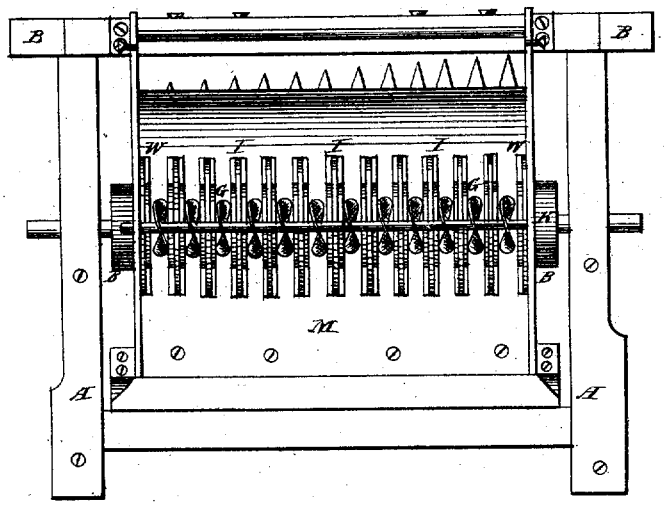
Figure 1:
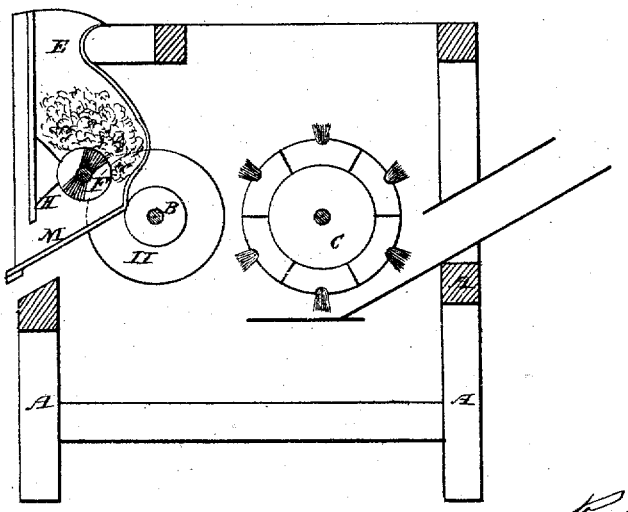

Figure 1 is a longitudinal vertical section of a cotton-gin embodying my invention, and Fig. 2 is a front elevation of the same with the seed-board removed.

A represents the frame of a cotton-gin with the saw-cylinder B, brush-cylinder C, and ribs M, all constructed, located, and operated in the usual manner. E represents the end side board of the roll-box. Lengthwise in the roll-box is located a horizontal shaft or roller, F, which may be of any desired diameter, and of equal length with the roll. This shaft or roller is placed so as to be at the bottom of the roll, near the lower edge of the seed-board H, and is provided with a series of flanges, G G, at equal distance from each other, which distance corresponds with the spaces between the saws I I on the cylinder B. The roller F is provided with journals, which are supported in bearings fastened to the end side boards. On one end of the said roller is a pulley, K, and motion is communicated by means of a belt around said pulley from the saw-cylinder. As the roller F revolves on its axis, the flanges G G in their revolutions mesh into the parts of the roll that pass between the saws, thereby expelling the seed from the roll and pressing the lint against the saws. As they revolve the flanges expel the seed from the roll-box, conveying the seed in their exit in contact with the saws, enabling the saws to detain and return to the roll any seed that has not been entirely freed from lint. By this means the roll is kept free from surplus seed, the lint is kept in contact with the saws, the seed is prevented from accumulating in the roll-box, and the escape of seed not properly freed from lint is prevented. The end side boards E of the roll-box are arranged in relation to the end saws on the saw-cylinder B, in such a manner as to prevent the roll from being more extended in length than the series of saws I I on the saw-cylinder. This is accomplished by dispensing with the rib, which is located between the end saw and end side board at each end of the series of ribs M, and locating the end side boards E in such close proximity to the end saws as to prevent any part of the roll from getting between the end side boards and the end saws. By this means the saws are enabled to operate on the roll throughout its entire length, thereby preventing the roll from breaking the ends.

Having thus fully described my invention, what I claim as new, and desire to secure by Letters Patent, is—

The roller or shaft F with flanged disks G G, combined and arranged in the roll-box to operate in connection with the gin-saws, substantially in the manner and for the purpose herein set forth.

In testimony that I claim the above I herewith sign my name in presence of two witnesses.

ROBERT McKENNA.

Witnesses:

C. ALEXANDER,

T. H. ALEXANDER.